United States Patent [19]

Klappert

[11] Patent Number: 4,992,886

[45] Date of Patent: Feb. 12, 1991

[54] METHOD AND APPARATUS FOR ENCODING DATA WITHIN THE SUBCODE CHANNEL OF A COMPACT DISC OR LASER DISC

[75] Inventor: Walter R. Klappert, Topanga, Calif.

[73] Assignee: WNM Ventures, Inc., Burbank, Calif.

[21] Appl. No.: 287,423

[22] Filed: Dec. 20, 1988

[51] Int. Cl.⁵ ............................................. G11B 7/00
[52] U.S. Cl. .................................... 358/342; 358/341
[58] Field of Search .................. 369/30, 32; 360/72.2, 360/72.1, 18, 39, 13; 358/343, 341, 310, 342; 340/747

[56] References Cited

U.S. PATENT DOCUMENTS

| | | | |
|---|---|---|---|
| 4,187,544 | 2/1980 | Larner | 360/13 |
| 4,695,904 | 9/1987 | Shinyagaito | 360/72.2 |
| 4,729,043 | 3/1988 | Worth | 360/39 |
| 4,775,969 | 10/1988 | Osterlund | 360/72.2 |
| 4,779,252 | 10/1988 | Custers | 369/30 |
| 4,814,756 | 3/1989 | Chauvel | 340/747 |

Primary Examiner—Robert L. Richardson
Attorney, Agent, or Firm—Blakely, Sokoloff, Taylor & Zafman

[57] ABSTRACT

An apparatus and method for encoding graphical data on an audio compact disc or laser vision disc without affecting the digitized sound stored in the main audio channel by utilizing what is known as the subcode channel of the compact or laser disc. The subcode channel is reserved for information other than digitized compact or laser disc audio data. Multiple active areas are created on each screen or picture displayed, with each active are being synchronized with the information in the main channel by creating multiple bands in the subcode channel which can be simultaneously displayed and loading graphics and/or lyrics data which is to be displayed in the various bands.

13 Claims, 6 Drawing Sheets

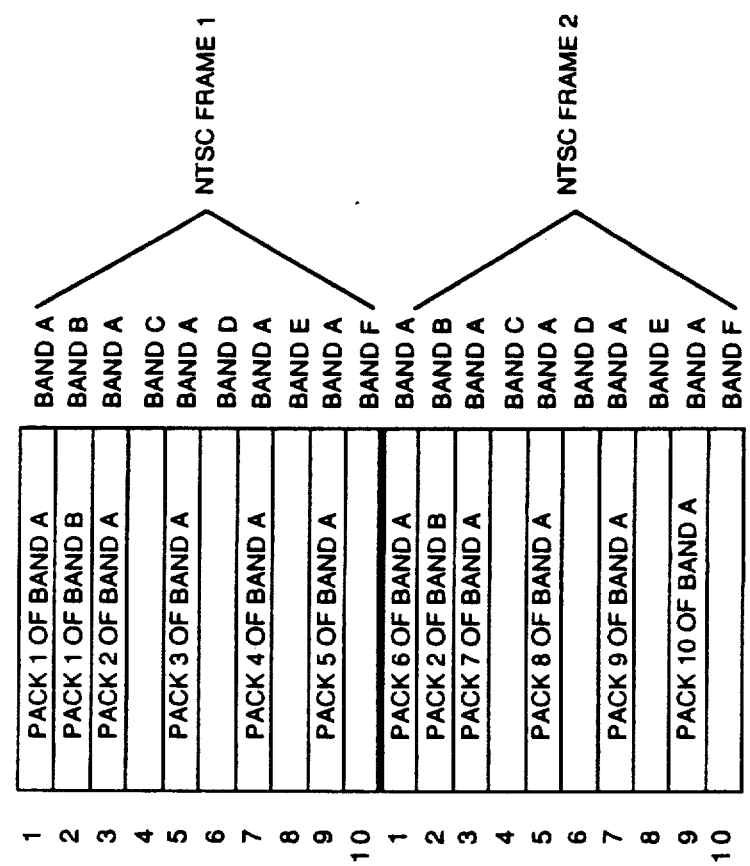
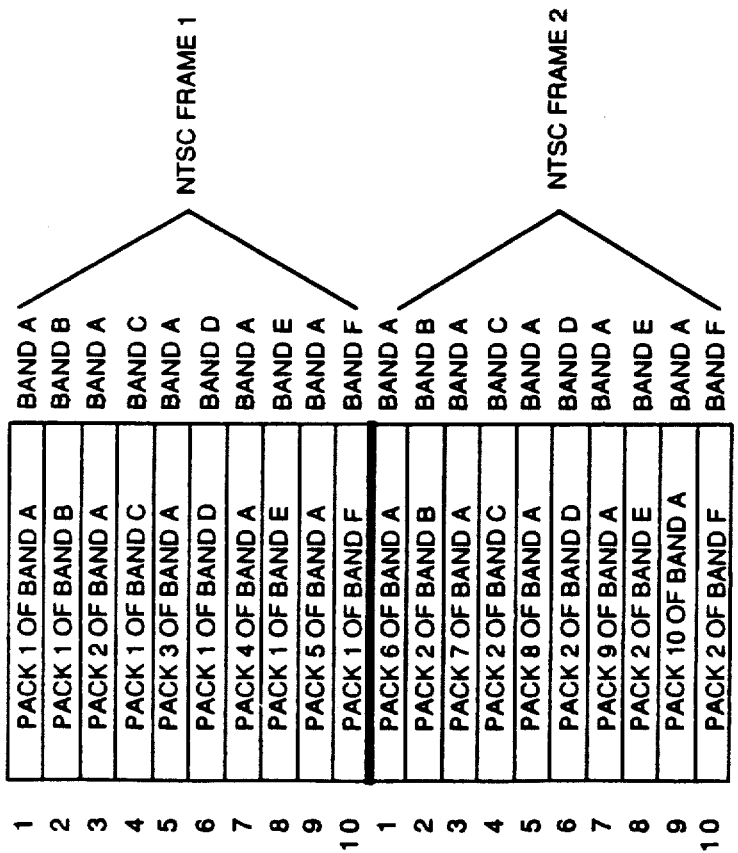

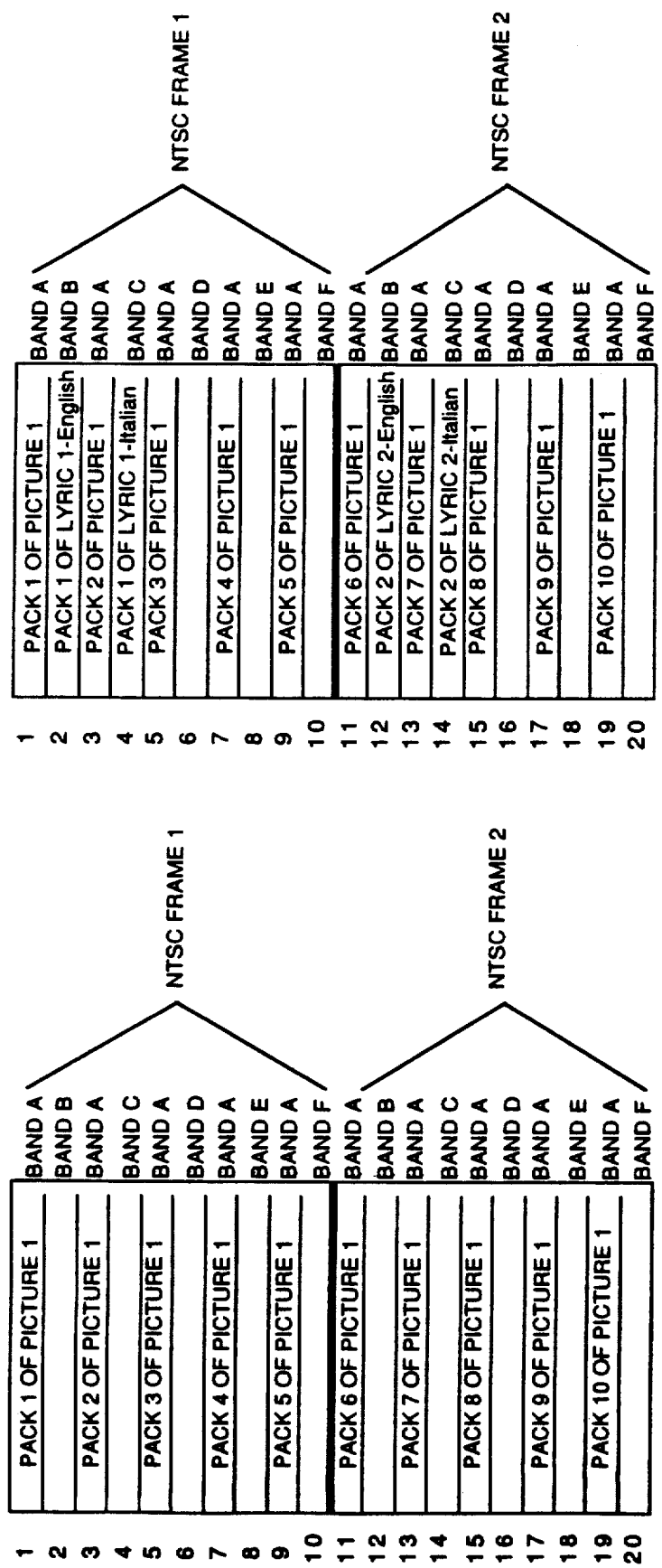

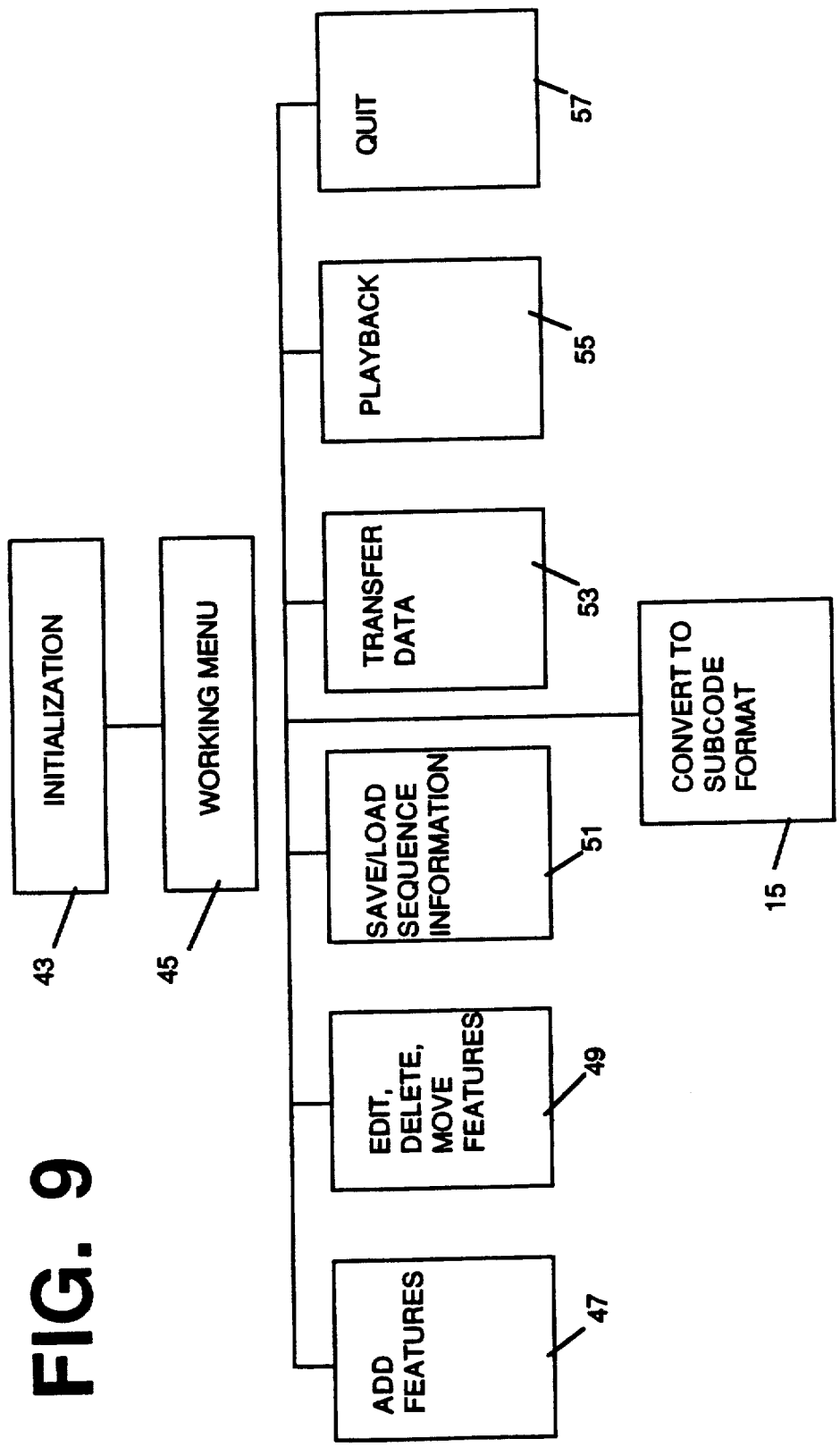

METHOD AND APPARATUS FOR ENCODING DATA WITHIN THE SUBCODE CHANNEL OF A COMPACT DISC OR LASER DISC

SUMMARY THE INVENTION

The present invention is an apparatus and method for encoding graphical data on an audio compact disc or laser vision disc without affecting the digitized sound stored in the main audio channel by utilizing what is known as the subcode channel of the compact or laser disc which is reserved for information other than digitized compact or laser disc audio data. Specifically, an apparatus and method is disclosed for creating multiple active areas on each screen or picture displayed. The techniques will be described with reference to the subcode channel on audio compact discs, but have equal application to laser vision discs as should be apparent to those skilled in the art.

Presently, audio compact discs use 95% of their capacity to store digitized sound, leaving 5% for what is called the subcode channel or area. The subcode channel, which corresponds to about 30 megabytes of data capacity, to the extent it is utilized at all, is used for graphics information or MIDI information. (An apparatus and method for encoding MIDI data on the subcode channel is described in copending application Ser. No. 211,355 filed June 24, 1988.) In order to play back graphics subcode data, it is necessary for a compact disc player to include a graphics decoder to decode the graphics subcode data.

Due to the limited bandwidth, subcode channel graphics are not full motion video. Instead, they are still pictures and text which can change gradually over several seconds. Each graphics "screen" (which can be composed of combinations of photographs, illustrations and text) is created from only 16 colors, not the myriad of colors available for film and video pictures. The selection of 16 colors, which is from a spectrum of 4,096 colors, can change from screen to screen (16 shades of gray can be replaced by a spectrum of 16 different colors). However, only 16 colors are available at one time.

For this reason, subcode channel graphics cannot compete with the look of motion picture or video clips. Rather, such graphics augment the audio on a compact disc, such as emphasizing information about the recording as it plays.

Examples of the use of subcode channel graphics are:

(i) writing lyrics onto a television screen as they are being heard, much like the lyrics on an album jacket.

(ii) translating lyrics into languages other than the language in which they're being sung. (iii) explaining what is occurring in the music (soloists, timings, counterpoint, spatial arrangement of the instruments).

(iv) providing background to the listener.

(v) creating a narrative or abstract visual accompaniment to the music.

(vi) pictures of the artist or fan magazine information.

(vii) sub-titling movies by keying the graphics over live video off a laser disc.

BRIEF DESCRIPTION OF THE DRAWINGS

FIG. 2 is an illustration of the banding technique of the subject invention with a single 50% band and five 10% bands.

FIG. 3 is an illustration of the banding technique of the subject invention with a single 50% band and one 10% band.

FIG. 6 is an illustration of the first 20 records of a sequenced file created by the program of block 21 containing "A" band information.

FIG. 7 is an illustration of the first 20 records of a sequenced file created by the program of block 21 containing A band, B band and C band information.

FIG. 9 is a functional block diagram of the program of block 21.

DETAILED DESCRIPTION OF THE INVENTION

Figure 1:
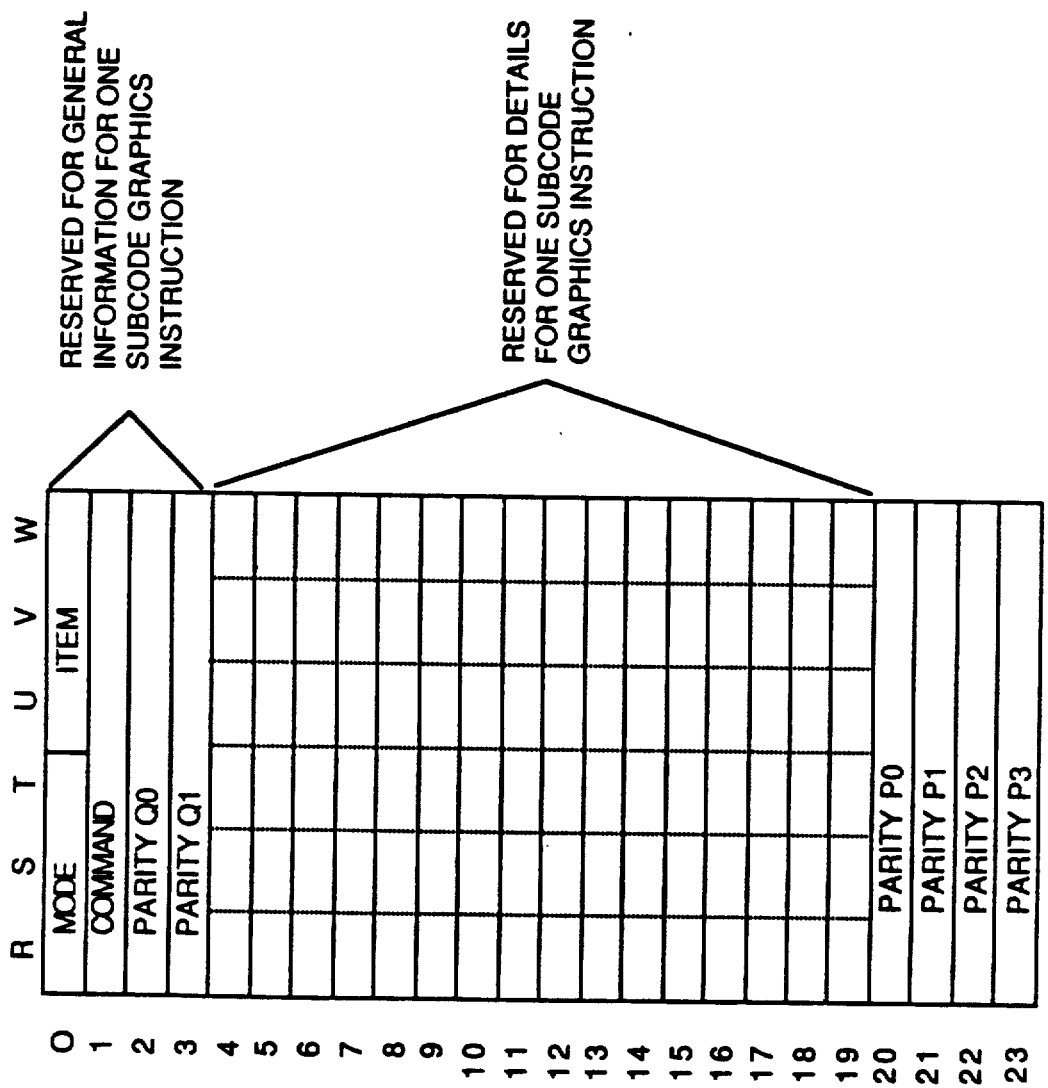
FIG. 1 is an illustration of a single subcode pack used to store one subcode graphics instruction.

Audio compact discs, by an industry standard, set aside 5% of the possible data storage for non compact disc audio. In other words, 95% of the possible data storage is used to store the digitized audio recording. The reserved 5% portion known as the subcode channel, in effect, stores purely numerical data in an industry standard format. In particular, data in the subcode channel is stored in packs of 24 words with each word consisting of 6 bits labeled R, S, T, U, V and W respectively as shown in FIG. 1. Each of the bits in the subcode channel is one of 6 sub channels. Details regarding the format of subcode data on a compact disc are set forth in a document known as the "Red Book" which is a technical specification created by Phillips N. V. and Sony Corporation entitled "Compact Disc Digital Audio System Description." The foregoing details ar found in the section entitled "Sub Channels R, S, T, U, V and W."

FIG. 1 illustrates a single pack of subcode data. Although there are a total of 24 six bit words in a pack, according to the "Red Book" specification, only 16 words of a pack are available for data plus two words of header information (command, mode and item), at a rate of 300 packs per second. In other words, for every second of audio on the compact disc main channel, up to 300 packs of graphics subcode data is available for creating graphics images on a television display. The time a particular graphic takes to be displayed is a function of how many graphic instructions are needed to describe the graphic.

To illustrate this, a full screen of graphics information constitutes a row 288 pixels wide by 192 pixels high. However, graphics subcode data is available only in units referred to as fonts, each of which is six pixels wide and twelve pixels high. Thus, a full screen of information is 48 fonts wide and 16 fonts high for a total or 768 fonts per screen. Each font can contain between 1 and 16 colors.

The time it takes to display a graphic is a function of the number of instruction it takes to describe the graphic. In this connection, the simplest graphic (just one or two colors) requires one instruction per font or 768 instructions for the whole screen. Since each graphic instruction, according to the "Red Book" definition, requires a subcode pack, at 300 packs per second, a simple full screen graphic requires approximately 2.5 seconds to be displayed. Similarly, a complicated full screen graphic containing 16 colors can take up to nearly 10.25 seconds to be displayed. In other words, since there are 768 fonts per screen, and 4 instructions are needed to describe a font having 16 colors, as many as 3072 instructions could be needed for a full screen display. Thus, a graphics instruction specifies which of the available 768 fonts is to be written, its contents and its color or colors.

In a typical application utilizing the subcode channel, for example, displaying the lyrics of a song as it is being played one line at a time, the graphics instructions need only update a single line of 48 fonts which can be accomplished in less than 0.20 seconds. However, it is frequently desirable to display a line of lyrics in two or more languages. In this connection, assuming that it is desired to display lyrics in two languages, one line of lyrics in the first language would necessarily be displayed prior to the display of a line of lyrics in the second language, since 48 subcode packs would be required to describe the first line, and 48 subcode packs occurring at a later time would be needed to describe the second line. In this example, only one of the two lines can be synchronized with the music since the second line cannot be displayed until after the first line has been displayed.

The present invention is directed to a method and apparatus which enables the display of multiple active areas on a graphic display such that it appears that multiple activities are occurring simultaneously. The present invention accomplishes this by splitting the graphics instructions into bands such that some of the 300 instructions available each second are dedicated to loading one active area, with the rest of the instructions being dedicated to loading one or more other active areas. Banding is short for "splitting the bandwidth" which is, in essence, what is being done by using alternating data areas in subcode packs for different purposes. A band is that data which is dedicated to changing a predetermined portion of a video display. In the preferred embodiment, half of the instructions, i.e. 150 out of every 300 packs, are dedicated to loading a picture band referred to as band "A" and the rest of the instructions are divided evenly among 5 lyric bands called bands B, C, D, E and F, with each lyric band getting only 10% of the packs or 30 instructions each second. Of course, the bands may be split differently, and more or less than six bands may be used.

Using this technique will increase the amount of time it takes to fill a complete screen. That is, assuming the A band, which uses 150 out of the 300 instructions each second, were used to load a full screen, it will take twice as long to load the screen than if all 300 instructions were used. However, when using the banding technique of the present invention, the size of the active areas may be made proportional to the amount of time allocated to the band for the graphics instructions. Thus, the A band should typically fill no more than one-half of the screen.

In a further example, loading the full screen using a 10% band would take 102.4 seconds for a 16 color picture. It is for this reason that the 10% bands are usually used to load lyrics. An active area for lyrics can be a single font high which stretches across all of the 48 fonts which span a single line of the screen. Nearly all 48 fonts of width are needed because text characters, in order to be easily readable and, depending upon the text style, can fit an average of only 35 to 40 characters across the 48 font width of the screen. At 30 fonts per second, this area will load in 1.6 seconds. For most songs, a lyric line which will fit in the 35 to 40 characters available will take 1.6 seconds, or longer, to sing. However, long lyrics, sung quickly, can exceed the 35 to 40 characters every 1.6 second rate. However, in these cases, two bands can be used such that two lyric lines of 35 to 40 characters can be loaded every 1.6 seconds.

By way of illustration, if the first picture which will be displayed when the music on the compact disc begins occupies the top half of the screen or 384 fonts and uses 16 colors, at four instructions per font, 1,536 instructions will be needed, i.e., 1,536 subcode packs. At 300 packs per second, this picture would take 5.12 seconds to be displayed without banding or 10.24 seconds if the A band is used.

If the first lyric line is also to be displayed when the music on the compact disc begins, then its 48 fonts worth of information will require 48 packs.

The use of no more than six bands is preferred for the following reasons. In the United States, televisions accept video signals according to the NTSC standard which specifies that each video frame is 1/30 second, there being two video fields per screen. As noted above, there are 300 subcode data packs per second or 10 packs per NTSC frame. Thus, an NTSC frame can include graphics information corresponding to ten subcode packs. While allowing single subcode pack for each of ten bands per NTSC frame would allow ten lines of lyrics to be displayed sufficiently quickly for most songs, there would be no space for a picture of any type.

Referring now to FIG. 2, a data layout is shown for the use of six bands, with one-half the packs assigned to band A and one of every ten packs assigned to bands B-F. Similarly, FIG. 3 show a layout wherein only bands A and B have graphics information which is to be displayed.

Figure 4:
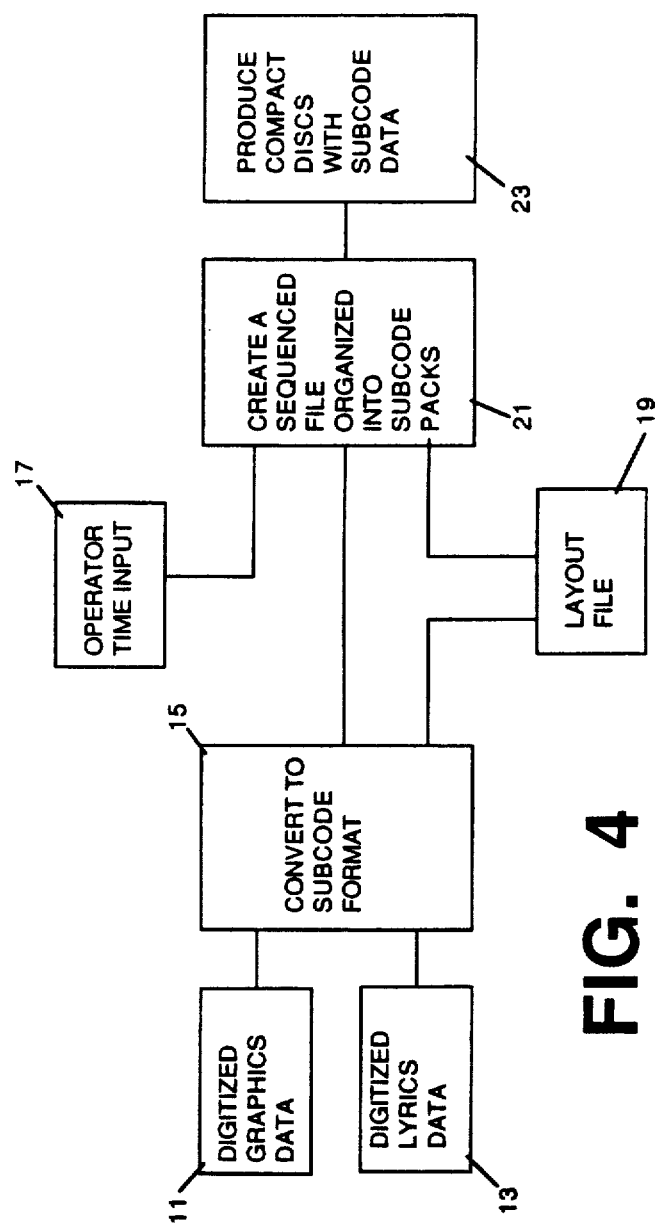
FIG. 4 is a block diagram illustrating the steps for creating compact discs with subcode data.

FIG. 4 illustrates in block diagram form the steps needed to produce compact discs with graphics data organized into bands according to the present invention.

Block 11 represents files containing digitized 16 color graphics data, wherein each picture which is to be converted into subcode format is in a separate file. This graphics data is created using techniques well known to those skilled in the art, and typically involves scanning a full color picture to create a digitized file representing the picture, using, for example, an AT & T Targa 16 board which accepts NTSC tape or live camera images and creates a 16 bit digitized image. The digitized picture is then displayed on a color monitor and converted by an artist/operator into a digitized picture having no more than 16 colors so that the picture can be converted into subcode format which allows only 16 colors per picture. These files do not contain any time information, but typically the offset from the beginning of the compact disc audio is known to the person who will be creating the file used to press the compact discs.

Similarly, block 13 represents files containing digitized lyrics data, wherein each line of lyrics which is to be converted into subcode format is in a separate file. This lyrics data is created using techniques well known to those skilled in the art, and typically involves creating an ASCII file of the lyrics with a word processor and then converting the ASCII text to a graphics file using a desired character style. A separate file is created for each lyrics line, and there will be a one-to-one correspondence between lyric lines in each language which is to be displayed. For example, if the lyrics to a song are to be displayed in English and Italian, there is a line of Italian for every line in English.

Thus, blocks 11 and 13 result in a number of files of digitized graphical data wherein there is one file for each picture and one file for each line of lyrics.

Once files have been created representing 16 color digitized pictures and lyrics, the data in the files must be converted into subcode format. This is accomplished by block 15 which is a computer sub-program which reads digitized graphics files represented by blocks 11 and 13 to create files in subcode format, i.e. subcode packs with graphics instructions as defined by the Red Book, such that there is one file for each picture and one file for each line of lyrics. The files begin with header information which specifies which band the data should be placed in. Since the digitized graphics data of block 11 and the digitized lyrics data of block 13 are files containing graphics information, a single program may be used to read these files and convert them to subcode format. The various functions performed by the program of block 15 will be described below with reference to FIG. 8.

1. Another input to program 15 is the information in a layout file 19 which describes the allocation of subcode packs in each video frame for each band. The layout file is created when the disc tracks are designed and includes the following information
    (a) which pack or packs in each frame are dedicated to each band.
    (b) what fonts on the video screen will be updated by each band.
    (c) what graphics channel is each band dedicated to.

Figure 5:
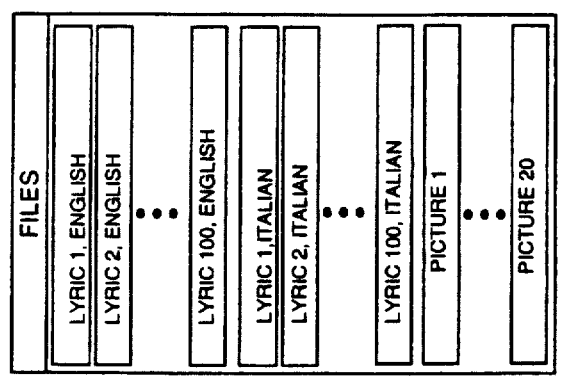
FIG. 5 is an illustration of files created for use by sequencing block 21 when the banding technique of the present invention is used.

To illustrate these subcode files, assume that a particular song has 100 lyric lines and it is desired to display the lyrics in two languages, English and Italian. Thus, there will be 200 files which represent the lyrics with each file having 48 subcode packs, assuming that each line of lyric fits on a single 48 font wide screen line. Additionally, assume there are 20 pictures, each having 384 fonts having 16 colors for a total of 1,536 subcode packs. Thus, there will be a total of 220 files as shown in FIG. 5, with each file consisting of the subcode packs for the corresponding lyric line or picture.

While the subcode packs or files created by the sub-program of block 15 may be used to press compact discs with subcode information, the decoder in the compact disc player would have no way of knowing when in time the data in the subcode packs should be displayed and would simply display the data in the same order as the subcode packs. If arranged as shown in FIG. 5, first lyric lines 1-100 in English would be displayed then lyric lines 1-100 in Italian would be displayed and then pictures 1-20. This of course would make it impossible to synchronize the graphical display with the main channel audio.

Accordingly, according to the present invention, after files of subcode packs have been created by the sub-program of block 15, a second program, which may be the rest of the main program that contains the sub-program of block 15 and is shown in FIG. 4 as block 21, arranges the subcode packs in a single large sequenced file as described below.

The computer program of block 21 attached herewith as Appendix 1 (not intended to be printed, but to remain in the patented file), must create a file wherein the various subcode packs in the 220 lyric and picture files are sequenced so that the pictures and lyrics will be displayed correctly synchronized with the main channel audio. Correctly, sequencing the lyrics requires a knowledge of the offset from the beginning of the main channel. This information is easily obtained by utilizing a SMPTE time code from which the proper offset for each lyric line can be determined.

With the proper offset information at hand, program 21 as it reads each lyric file, requests that an operator input the correct time offset for that line as represented by block 17. Similarly, for each of the picture files, as program 21 reads each picture file, the operator is requested to input the correct offset for that picture. Thus, assuming that the SMPTE time code for lyric 1 is 00:00:01 seconds and it is desired that picture 1 start being displayed with the beginning of the lyric, the operator would input 00:00:01 for lyric line 1, English, 00:00;01 for lyric line 1 Italian and 00:00:01 for picture 1.

The information in the layout file 19 is compared with a band allocation table which is part of a header record of each feature file as will be described below. This process is continued until each file containing subcode data has a main channel audio offset associated therewith.

Using this offset information, program 21 then creates a single sequenced filed as follows. Assuming band A is a 50% band, picture 1 file is read and the subcode packs are written such that every other record in the output file is left blank as shown in FIG. 6 which illustrates the first 20 records of the sequenced file. This process is then repeated for each of the remaining picture files, i.e. picture files 2-20 in the example described above, with the starting record for each picture file determined by the offset for that picture. For example, if picture 2 has an offset of 20 seconds, since there are 300 packs per second, picture 2 must start at record 6,000 in the sequenced file.

Similarly, assuming that the English lyrics are to be placed in band B, a 10% band, and the Italian lyrics in band C, another 10% band, the first subcode pack for English lyric 1 will be placed at record 2 in the sequenced file with each subsequent subcode pack of English lyrics offset by 10 records, and the first subcode pack for Italian lyric 1 will be placed at record 3 in the sequenced file with each subsequent subcode of Italian lyrics pack offset by 10 records as shown in FIG. 7.

The sequenced subcode packs of FIG. 7 is a file which may then be used to produce compact discs with subcode data as indicated in block 23. The process for pressing compact discs may be performed by any company which has acquired the necessary licenses from Sony Corporation or Phillips N.V.

When the compact disc is played utilizing a graphics decoder, the first screen displayed i.e., the first 1/15 second will be based upon the subcode packs shown in FIG. 7, i.e., the first 10 packs of picture 1 and packs 1 and 2 of the English lyrics and packs 1 and 2 of the Italian lyrics. Subsequent screens will display the next 10 packs of picture 1 and the next 2 packs of English and Italian lyrics and so on until all the information in the subcode packs has been displayed.

Figure 8:
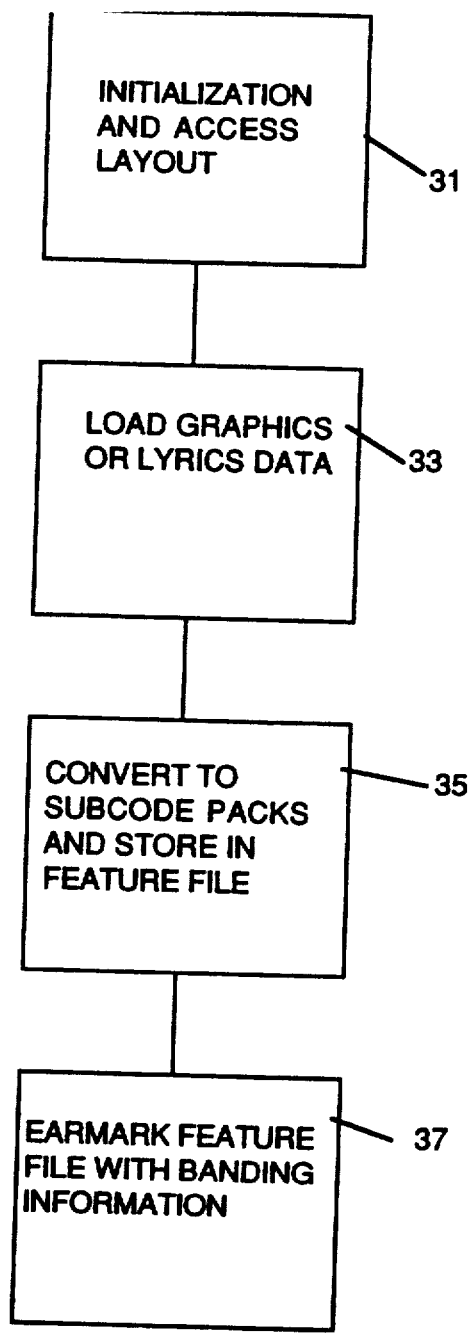
FIG. 8 is a functional block diagram of the sub-program of block 15.

FIG. 8 is a diagram which displays the functions performed by sub-program 15. Initialization and access layout parameters block 31 reads parameters which describe how the subcode conversion is to be performed, such as the size of a section of the graphic to be converted, where the graphic will be placed on the display, i.e., which fonts will be used, the identity of the band and so on.

Load graphics or lyrics data block 33 accesses the raw graphics data generated by block 11 or 13 (for example, an AT&T Targa 16 board) and stores the graphics or lyrics data in memory or on a disk file called a feature file for conversion to subcode packs. The feature file includes the data in subcode format as well as the following information in the first 48 bytes of header data:

(1) four bytes which specify the number of packs the data will be spread over.
(2) a band allocation table describing which packs in a frame are dedicated to the various bands.
(3) a field defining which band the data belongs in.

Subcode packs are earmarked by the header bytes for transfer data block 53 which processes the earmarked packs as described below.

FIG. 9 is a diagram which displays the functions performed by program 21. When program 21 is started, if a sequence table was created in the prior session, it is loaded into memory by initialization 43. The sequence table is created by program 21 and is a list of features and where they reside in time, i.e. their offsets from the start of the main audio channel. The artist/operator is then presented with two screens. One screen displays a menu 45 which specifies the operations supported by the program which may be chosen, which as shown in FIG. 9 are add features 47, edit, delete, move features 49, save/load sequence information 51, convert to subcode format 15, transfer data 53, playback 55 and quit 57.

When not specifically in another modes the program is in add features 47. In this mode, the artist/operator can establish the offset times for the features that have been converted to subcode format. In this connection, in the present embodiment of the program, the second screen displays a graphical representation of features. For example, features may be represented as bars which vary in length according to how long it takes the feature to load.

Additionally, the artist/operator can move the features in time using a stylus and bit pad which control a cursor on the screen which allows the user to "pick-up" and move features.

Edit, delete and move features block 49 allows the user to change or adjust the sequence list using word processing types of editing techniques.

Save/load sequence information block 51 allows the user to write the sequence table to a hard disk for back up or to establish the final sequence table.

Convert to subcode format block 15 converts the raw graphics files to subcode data as described before.

Transfer data block 53 transfers subcode data from the various feature files to a single target file, placing the subcode data created by sub-program 15 at the correct offset which was established by program 21.

Specifically, transfer data block 53 reads the sequence table, opens the feature files in the order they fall according to the table, takes the subcode data in the file and transfers it to the correct location as determined by the specified offset, distributing the data according to the banding information in the header of the feature file.

Playback block 15 allows the user to playback the subcode data through a graphics decoder using the data on the hard disk.

Quit block 57 allows the user to leave the program.

A listing of the block 21 program including the block 15 sub-program is attached as Appendix 1 which is a hexadecimal listing of the object code in executable form for an IBM AT or compatible computer.

Appendix 2 is a hexadecimal of a sample layout file 19 having the banding described in this application (i.e., 50% picture band and five 10% lyric bands.

I claim:

1. An apparatus for encoding at least two sets of data within a subcode channel of a compact disc or laser disc, said compact disc or laser disc including a main channel having a start time, and said subcode channel, said encoding being performed within separate bands of said subcode channel for each said set of data, wherein the encoded data, after being decoded, may be displayed on a video display such that said at least two sets of data are displayed synchronously with each other, said apparatus comprising:

(a) means for converting analog graphical data representing at least one picture to a digitized graphical data form having no more than sixteen colors for each of said at least one picture and saving each of said pictures in said digitized graphical form in a first set of separate files;

(b) means for converting binary data representing at least one line of lyrics to a digitized graphical data form having no more than sixteen colors for each of said at least one line of lyrics and saving each of said at least one line of lyrics in said digitized graphical form in a second set of separate files;

(c) means for converting the at least one picture and the at least one line of lyrics in said digitized graphical data form in said first and second sets of separate files to subcode format, and adding information specifying the band in which said data in said subcode format is to be located and saving each of said pictures in said subcode format and each of said lyrics lines in said subcode format including said band information in subcode format in a respective third and fourth sets of separate files;

(d) means for creating a sequenced file which includes each of said pictures in subcode format and each of said lyrics lines in subcode format, wherein each said picture in subcode format and each said lyric line in subcode format is sequenced according to the band information associated with each file in said third and fourth sets of files and a time offset from the start time of the main channel.

2. The apparatus defined by claim 1 wherein said means for converting to subcode format comprises means for reading said first and second sets of files, means for converting the read data into subcode packs and writing one feature file corresponding to each of said read files, each of said feature files having a header record for (i) specifying the number of subcode packs needed to hold the subcode formatted data (ii) describing in a band allocation table which subcode packs within each video frame are dedicated to the various bands, and (iii) identifying which band has been assigned to each subcode pack within that feature file.

3. The apparatus defined by claim 2 wherein said means for creating said file which includes each of said pictures in subcode format and each of said lines of lyrics in subcode format comprises means for reading the band allocation table and opening the feature files in an order specified in the band allocation table and transferring the subcode packs loaded from each opened feature file to said sequenced file so that the subcode packs in each feature file is sequenced according to its assigned band and time offset.

4. An apparatus for encoding at least two sets of data within a subcode channel of a compact disc or laser disc, said compact disc or laser disc including a main channel having a start time, and said subcode channel, said encoding being performed within separate bands of said subcode channel for each said set of data, wherein the encoded data, after being decoded, may be displayed on a video display such that said at least two sets of data are displayed synchronously with each other, said apparatus comprising:
  (a) means for converting analog graphical data representing at least one picture to a digitized graphical data form having no more than sixteen colors for each of said at least one picture and saving each of said pictures in said digitized graphical form in a first set of separate files;
  (b) means for converting the at least one picture in said digitized graphical data form in said first set of separate files to subcode format, and adding information specifying the band in which said data in said subcode format is to be located and saving each of said pictures in said subcode format including said band information in subcode format in a second set of separate files;
  (c) means for creating a sequenced file which includes each of said pictures in subcode format, wherein each picture in subcode format is sequenced according to the band information associated with each file in said second set of files and a time offset from the start time of the main channel.

5. An apparatus for encoding at least two sets of data within a subcode channel of a compact disc or laser disc, said compact disc or laser disc including a main channel having a start time, and said subcode channel, said encoding being performed within separate bands of said subcode channel for each said set of data, wherein the encoded data, after being decoded, may be displayed on a video display such that said at least two sets of data are displayed synchronously with each other, said apparatus comprising:
  (a) means for converting binary data representing at least one line of lyrics to a digitized graphical data form having no more than sixteen colors for each of said at least one line of lyrics and saving each of said at least one line of lyrics in said digitized graphical form in a first set of separate files;
  (b) means for converting the at least one line of lyrics in said digitized graphical data form in said first set of separate files to subcode format, and adding information specifying the band in which said data in said subcode format is to be located and saving each of said lines of lyrics in said subcode format including said band information in subcode format in a second set of separate files;
  (c) means for creating a sequenced file which includes each of said lyrics lines in subcode format, wherein each said lyric line in subcode format is sequenced according to the band information associated with each file in said second set of files and a time offset from the start time of the main channel.

6. A method for encoding at least two sets of data within a subcode channel of a compact disc or laser disc, having a main channel having a start time, and a subcode channel, within a separate band of said subcode channel for each set of data, such that the encoded data may be displayed on a video display such that said at least two sets of data are displayed synchronously with each other, said method comprising the steps of:
  (a) converting data representing at least one picture to digitized graphical data having no more than sixteen colors for each picture and saving each of said pictures in one set of separate files;
  (b) converting data representing at least one line of lyrics to digitized graphical data having no more than sixteen colors for each lyrics line and saving each line of said lyrics data in a second set of separate files;
  (c) converting the digitized graphical data and the lyrics data in said first and second sets of separate files to subcode format, including information specifying the band in which said data is to be located and saving each of said pictures and each of said lyrics lines including said band information in subcode format in a respective third and fourth sets of separate files;
  (d) creating a file which includes each of said picture files in subcode format and each of said lyrics files in subcode format, wherein each picture and each lyric line is sequenced according to the band information associated with each file in said third and fourth sets of files and a time offset from the start time of the main channel.

7. A method for encoding at least two sets of data within a subcode channel of a compact disc or laser disc, having a main channel having a start time, and a subcode channel, within a separate band of said subcode channel for each set of data, such that the encoded data may be displayed on a video display such that said at least two sets of data are displayed synchronously with each other, said method comprising the steps of:
  (a) converting data representing at least one picture to digitized graphical data having no more than sixteen colors for each picture and saving each of said pictures in a set of separate files;
  (b) converting the digitized graphical data in said set of separate files to subcode format, including information specifying the band in which said data is to be located and saving each of said pictures including said band information in subcode format in a second set of separate files;
  (d) creating a file which includes each of said picture files in subcode format, wherein each picture is sequenced according to the band information associated with each file in said second set of files and a time offset from the start time of the main channel.

8. A method for encoding at least two sets of data within a subcode channel of a compact disc or laser disc, having a main channel having a start time, and a subcode channel, within a separate band of said subcode channel for each set of data, such that the encoded data may be displayed on a video display such that said at least two sets of data are displayed synchronously with each other, said method comprising the steps of:
  (a) converting data representing at least one line of lyrics to digitized graphical data having no more than sixteen colors for each lyrics line and saving each line of said lyrics data in a set of separate files;
  (c) converting the digitized graphical data in said set of separate files to subcode format, including information specifying the band in which said data is to be located and saving each of said lyrics lines including said band information in subcode format in a second set of separate files;
  (d) creating a file which includes each of said lyrics files in subcode format, wherein each lyric line is sequenced according to the band information associated with each file in said second set of files and a time offset from the start time of the main channel.

9. A method for encoding at least two sets of data within a subcode channel of a compact disc or laser disc, said compact disc or laser disc including a main channel having a start time, and said subcode channel, said encoding being performed within separate bands of said subcode channel for each said set of data, wherein the encoded data, after being decoded, may be displayed on a video display such that said at least two sets of data are displayed synchronously with each other, said method comprising the steps of:

(a) converting analog graphical data representing at least one picture to a digitized graphical data form having no more than sixteen colors for each of said at least one picture and saving each of said pictures in said digitized graphical form in a first set of separate files;

(b) converting binary data representing at least one line of lyrics to a digitized graphical data form having no more than sixteen colors for each of said at least one line of lyrics and saving each of said at least one line of lyrics in said digitized graphical form in a second set of separate files;

(c) converting the at least one picture and the at least one line of lyrics in said digitized graphical data form in said first and second sets of separate files to subcode format, and adding information specifying the band in which said data in said subcode format is to be located and saving each of said pictures in said subcode format and each of said lyrics lines in said subcode format including said band information in subcode format in a respective third and fourth sets of separate files;

(d) creating a sequenced file which includes each of said pictures in subcode format and each of said lyrics. lines in subcode format, wherein each said picture in subcode format and each said lyric line in subcode format is sequenced according to the band information associated with each file in said third and fourth sets of files and a time offset from the start time of the main channel.

10. The method defined by claim 9 wherein said step for converting to subcode format comprises the steps of reading said first and second sets of files, converting the read data into subcode packs and writing one feature file corresponding to each of said read files, each of said feature files having a header record for (i) specifying the number of subcode packs needed to hold the subcode formatted data, (i) describing in a band allocation table which subcode packs within each video frame are dedicated to the various bands, and (iii) identifying which band has been assigned to each subcode pack within that feature file.

11. The method defined by claim 10 wherein said step for creating said file which includes each of said pictures in subcode format and each of said lines of lyrics in subcode format comprises the steps of reading a band allocation table and opening the feature files in an order specified int he band allocation table and transferring the subcode packs loaded from each opened feature file to said sequenced file so that the subcode packs in each feature file is sequenced according to its assigned and time offset.

12. A method for encoding at least two sets of data within a subcode channel of a compact disc or laser disc, said compact disc or laser disc including a main channel having a start time, and said subcode channel, said encoding being performed within separate bands of said subcode channel for each said set of data, wherein the encoded data, after being decoded, may be displayed on a video display such that said at least two sets of encoded data are displayed synchronously with each other, said method comprising the steps of:

(a) converting analog graphical representing at least one picture to a digitized graphical data form having no more than sixteen colors for each of said at least one picture and saving each of said pictures in said digitized graphical form in a first set of separate files;

(b) converting the at least one picture in said digitized graphical data form in said first set of separate files to subcode format, and adding information specifying the band in which said data in said subcode format is to be located and saving each of said pictures in said subcode format including said band information in subcode format in a second set of separate files;

(c) creating a sequenced file which includes each of said pictures in subcode format, wherein each picture in subcode format is sequenced according to the band information associated with each file in said second set of files and a time offset from the start time of the main channel.

13. A method for encoding at least two sets of data within a subcode channel of a compact disc or laser disc, said compact disc or laser disc including a main channel having a start time, and said subcode channel, said encoding being performed within separate bands of said subcode channel for each said set of data, wherein the encoded data, after being decoded, may be displayed on a video display such that said at least two sets of encoded data are displayed synchronously with each other, said method comprising the steps of:

(a) converting binary data representing at least one line of lyrics to a digitized graphical data form having no more than sixteen colors for each of said at least one line of lyrics and saving each of said at least one line of lyrics in said digitized graphical form in a first set of separate files;

(b) converting the at least one line of lyrics in said digitized graphical data form in said first set of separate files to subcode format, and adding information specifying the band in which said data in said subcode format is to be located and saving each of said lines of lyrics in said subcode format including said band information in subcode format in a second set of separate files;

(c) creating a sequenced file which includes each of said lyrics lines in subcode format, wherein each said lyric line in subcode format is sequenced according to the band information associated with each file in said second set of files and a time offset from the start time of the main channel.

* * * * *

UNITED STATES PATENT AND TRADEMARK OFFICE
CERTIFICATE OF CORRECTION

PATENT NO. : 4,992,886
DATED : 2/12/91
INVENTOR(S) : Klappert

It is certified that error in the above-identified patent and that said Letters Patent is hereby corrected as shown below:

| | | |
|---|---|---|
| col. 02, line 37 | delete "ar" | insert --are-- |
| col. 04, line 27 | after "allowing" | insert --a-- |
| col. 06, line 16 | delete "00:00;01" | insert --00:00:01-- |
| col. 11, line 52 | delete "(i)" | insert --(ii)-- |
| col. 11, line 62 | delete "int he" | insert --in the-- |
| col. 12, line 01 | after "assigned" | insert --band-- |

Signed and Sealed this

Ninth Day of February, 1993

Attest:

STEPHEN G. KUNIN

*Attesting Officer*    Acting Commissioner of Patents and Trademarks